United States Patent Office 3,455,950
Patented July 15, 1969

3,455,950
N,N'-BIS-IMIDES OF POLYHALOSUBSTI-
TUTED POLYHYDROPOLYCYCLICDI-
CARBOXYLIC ACIDS
Henryk A. Cyba, Evanston, and Allen K. Sparks, Des
Plaines, Ill., assignors to Universal Oil Products Company, Des Plaines, Ill., a corporation of Delaware
No Drawing. Filed July 28, 1967, Ser. No. 656,677
Int. Cl. C07d 27/74; C09k 3/28; C09d 5/18
U.S. Cl. 260—326                    8 Claims

ABSTRACT OF THE DISCLOSURE

Novel compositions of matter comprising the N,N'-bis-imides of polyhalosubstituted polyhydropolycyclicdicarboxylic acids exemplified by the N,N'-bis-imide of 5,6,7,8,9,9 - hexachloro - 1,2,3,4,4a,5,8,8a - octahydro - 5,8-methano-2,3-naphthalenedicarboxylic acid. The compounds are useful as additives to plastics, resins, textiles, etc., whereby flame proof or fire retardant properties are added thereto.

---

This invention relates to novel compositions of matter comprising N,N'-bis-imides of polyhalosubstituted polyhydropolycyclicdicarboxylic acids. More specifically the invention reuates to these compositions of matter and to the use thereof as additives to plastics, polymers or other chemical compounds whereby desirable physical characteristics are imparted thereto.

It has now been discovered that novel compositions of matter comprising the N,N'-bis-imides of polyhalosubstiuted polyhydropolycyclicdicarboxylic acids may be prepared by reacting hydrazine with a polyhalosubstituted polyhydropolycyclic acid or anhydride thereof with in a certain mole ratio hereinafter set forth in greater detail to prepare the desired products. These novel compositions of matter will, therefore, be useful as an additive to plastics, polymers, copolymers, including such copolymers as an adiponitrile-butadiene-styrene formulation (commonly known as ABS), foams such as polyurethrane formulations, polyesters, polyolefins, polycarbonates, resins, coatings, paints, rubber, leather, fibers, textiles, fabrics, etc., the N,N'-bis-imides of the acid imparting the desirable physical characteristics of flame-proofing or fire-retardancy to the aforementioned materials. This property has special advantages when preparing plastic material which will be utilized in places which may be subject to excessive heat or possible flame, such as architectural panels for construction work, wall plugs for electrical connections, ash trays, etc. In addition, the compound when used as a constituent of paint, lacquer, varnishes or protective coatings, films, etc., will impart a fire resistancy to these compounds and, therefore, render them commercially attractive as articles of commerce. Furthermore, the flame retardancy of foams will greatly enhance their use as insulating material or as sound-proof material. In addition to the aforementioned use as a component of plastics, polymers, etc., it is also contemplated that the compositions of material of the present invention may also be used as an insecticide or as an ingredient of insecticidal formulations.

It is, therefore, an object of this invention to provide novel compositions of matter which possess desirable physical properties.

Another object of this invention is to provide novel composition of matter possessing desirable physical characteristics of flame-proofing and fire-retardancy which are useful as additives to other chemical formulations.

In one aspect, an embodiment of this invention resides in a composition of matter possessing the formula:

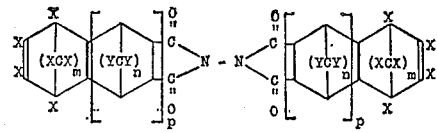

in which X and Y are selected from the group consisting of hydrogen and halogen radicals, at least two X's being halogen, $m$ is an integer of from one to two, $n$ ranges from zero to two, and $p$ ranges from zero to one.

A specific embodiment of this invention is found in the N,N'-bis-imide of 5,6,7,8,9,9-hexachloro-1,2,3,4,4a,5,8,8a-octahydro-5,8-methano-2,3-naphthalenedicarboxylic acid.

Other objects and embodiments will be found in the following further detailed description of this invention.

As hereinbefore set forth, the present invention relates to novel compositions of matter comprising the N,N'-bis-imides of polyhalo-substituted polyhydropolycyclicdicarboxylic acids. These compounds are prepared by condensing a polyhalo-substituted polyhydropolycyclicdicarboxylic acid or anhydride thereof with hydrazine in a manner hereinafter set forth in greater detail. Any suitable polyhalopolyhydrocyclicdicarboxylic acid or anhydride thereof may be used in the preparation of the desired compound, said acid or anhydride thereof being illustrated by the following general formulas:

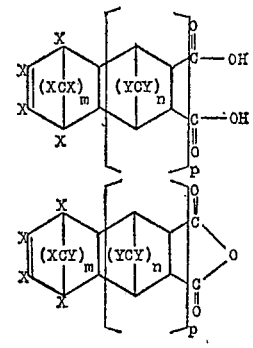

in which X is selected from the group consisting of halogen and particularly chlorine and/or bromine, and hydrogen radicals, at least two of the X's being halogen, Y is also selected from the group consisting of halogen and hydrogen radicals, $m$ is an integer of from one to two, $n$ ranges from zero to two and $p$ ranges from zero to one. Representative examples of the polyhalopolyhydropolycyclicdicarboxylic acids or anhydrides thereof which may be utilized include 1,4,5,6,7,7-hexachlorobicyclo[2.2.1]-5-heptent-2,3-dicarboxylic acid or the anhydride thereof which may be prepared by condensing maleic acid or maleic anhydride with hexachlorocyclopentadiene. Another example of the acid or anhydride which may be used comprises 5,6,7,8,9,9-hexachloro-1,2,3,4,4a,5,8,8a - octahydro-5,8-methano-2,3-napthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. Yet another example of a polyhalopolyhydropolycyclicdicarboxylic acid or anhydride which may be used in one which is prepared by condensing cyclopentadiene with maleic acid or maleic anhydride to form norborn-5-ene-2,3-dicarboxylic acid or anhydride and thereafter condensing this product with hexachlorocyclopentadiene to form 5,6,7,8,9,9-hexachloro-1,2,3,4,4a,5,8, 8a-octahydro-1,4,5,8-dimethano - 2,3 - naphthalenedicarboxylic acid or anhydride. It is to be understood that other starting materials may also be utilized to form similar acids or anhydrides. Illustrative examples of these starting materials include other acids such as fumaric acid, itaconic acid, citraconic acid, glutaconic acid, etc.; conjugated aliphatic dienes include 2-methyl-1,3-butadiene, 1,3-pentadiene, 1 - 3 - hexadiene, 2,4-hexadiene, 2-3-dimethyl-1,3-butadiene, 1,3-heptadiene, 2,4-heptadiene; conjugated octadienes, nonadienes, etc.; other suitable halo substituted cycloalkadienes which may be used include 1,2-dichlorocyclopentadiene, 1,2,2-trichlorocyclopentadiene, 1,2,3,4-tetrachlorocyclopentadiene, 1,2,3,4,5- pentachlorocyclopentadiene and similar compounds in which all or part of the chlorine is replaced by other halogen atoms and particularly bromine.

As hereinbefore set forth the aforementioned acids or anhydrides thereof are condensed with hydrazine, said acids or anhydrides being present in a molar excess of the hydrazines. This molar excess may range from 2:1 up to about 10:1 moles of acid or anhydride per mole of hydrazine. The condensation of the acids or anhydrides with hydrazine is effected at reaction conditions which include a temperature in the range of from about ambient (about 25° C.) up to about 200° C. or more and pressures ranging from one to 50 atmospheres or more. The preferred operating conditions are those within the lower range hereinbefore set forth, that is, ambient temperature and atmospheric pressure. However, if elevated temperatures in the upper limit of the range hereinbefore set forth are employed it is contemplated that the reaction will be effected at superatmospheric pressures. The superatmospheric pressures are generated by the use of a substantially inert gas such as nitrogen in the reaction vessel, said pressure being that which is sufficient to maintain a major portion of the reactants in the liquid phase. In addition, if so desired, the condensation may be effected in the presense of an inert organic solvent, the temperature which is employed then being the reflux temperature of the solvent. Specific examples of the type of solvents which may be used will include aromatic hydrocarbons, such as benzene, toluene, o-xylene, m-xylene, p-xylene, ethylbenzene, etc.; aliphatic and cycloaliphatic paraffins such as n-pentane, n-hexane, n-haptane, cyclopentane, cyclohexane, etc.; alcohols such as methyl alcohol, ethyl alcohol, n-propyl alcohol, isopropyl alcohol, n-butyl alcohol, etc.; dioxane, various esters, chlorinated hydrocarbons, ethers, etc. The residence time during which the condensation is effected will be sufficient to effect a substantially complete reaction and may vary from about 0.5 up to about 10 hours or more, the reaction being substantially complete when the theoretical amount of water which formed has been removed.

The process of the present invention may be effected in any suitable manner and may comprise either a batch or continuous type operation. For example, when a batch type operation is used a quantity of the particular acid or anhydride and hydrazine in a mole ratio of at least 2 moles of acid or anhydride per mole of hydrazine is placed in an appropriate apparatus along with a particular solvent if one is desired. The apparatus, which may comprise a condensation flask, is provided with heating and stirring means as well as a water trap whereby the water of reaction which is formed may be withdrawn. The flask is then heated to the desired operating temperature, which if a solvent is used, is the reflux temperature thereof, and allowed to proceed for a predetermined resident time. This time is calculated as when the theoretical amount of water has been removed. Following this the flask and contents thereof are allowed to cool to room temperature and the reaction product is recovered. The product is then separated from any solvent by conventional means such as evaporation, suction, filtration, etc., and recovered. In the event that superatmospheric temperatures and pressures are to be used, the reactor which is employed for the batch type operation may comprise a rotating or stirred autoclave whereby the desired pressure may be attained by charging nitrogen to the reactor prior to heating to the desired operating temperature.

It is also contemplated within the scope of this invention that the continuous manner of operation may be employed. When such a type of operation is used the starting material comprising the acid or anhydride in the type hereinbefore set forth in greater detail and the hydrazine are continuously charged to the reactor which is maintained in the proper operating conditions of temperature and pressure. In the event that a solvent is to be employed, one or both of the reactants may be dissolved in the solvent prior to entry into said reactor. Alternatively speaking, the solvent may be charged to the reactor in a separate stream if so desired. Upon completion of the desired residence time the reaction effluent is continuously withdrawn. The reaction product is separated from the water of reaction which is formed and the solvent by conventional means. In addition, the reaction product is also separated from any unreacted starting material which may still be present in the reactor, the latter being recycled to form a portion of the feedstock. The desired N,N'-bis-imides of the polyhalosubstituted polyhydropolycyclicdicarboxylic acids are recovered.

Examples of N,N'-bis-imides of polyhydropolycyclicdicarboxylic acids which may be prepared according to the process of this invention include the N,N'-bis-imide of 1,4,5,6,7,7 - hexachlorobicyclo[2.2.1]-5-heptene-2,3-dicarboxylic acid, the N,N'-bis-imide of 1,4,5,6,7,7-hexabrominebicyclo[2.2.1]-5-heptene-2,3-dicarboxylic acid, the N,N'-bis-imide of 1,4,5,6-tetrachlorobicyclo[2.2.1]-5-heptene-2,3-dicarboxylic acid, the N,N'-bis-imide of 1,4,5,6-tetrabromocyclo[2.2.1]-5-heptene - 2,3-dicarboxylic acid, the N,N'-bis-imide of 5,6,7,8,9,9-hexachloro-1,2,3,4,4a,5, 8,8a-octahydro-5,8-methano-2,3 - naphthalenedicarboxylic acid, the N,N'-bis-imide of 5,6,7,8,9,9-hexabromo-1,2,3, 4,4a,5,8,8a-octahydro-5,8-methano - 2,3 - naphthalenedicarboxylic acid, the N,N'-bis-imide of 5,6,7,8,9,9-hexachloro -1,2,3,4,4a,5,8,8a-octahydro-1,4,5,8-dimethano-2,3-naphthalenedicarboxylic acid the N,N'-bis-imide of 5,6, 7,8,9,9-hexabromo -1,2,3,4,4a,5,8,8a-octahydro-1,4,5,8-dimethano-2,3-naphthalenedicarboxylic acid, the N,N'-bis-imide of 5,6,7,8 - tetrachloro-1,2,3,4,4a,5,8,8a-octahydro-5,8-methano-2,3-naphthalenedicarboxylic acid, the N,N'-bis-imide of 5,6,7,8-tetrabromo-1,2,3,4,4a,5,8,8a-octahydro-5,8-methano-2,3-naphthalenedicarboxylic acid, etc. It is to be understood that the aforementioned N,N'-bis-imides are only representative of the class of compounds which may be prepared, and that the present invention is not necessarily limited thereto.

The following examples are given to illustrate the process of the present invention.

Example I

In this example 425 grams (1.0 mole) of 5,6,7,8,9,9-hexachloro - 1,2,3,4,4a,5,8,8a-octahydro-5,8-methano-2,3-naphthalenedicarboxylic anhydride in 200 grams of methyl alcohol was placed in a condensation flask. Following this 16.0 grams (0.5 mole) of hydrazine in 100 grams of methyl alcohol was slowly added drop-wise to the anhydride. The temperature at the beginning of the addition of the hydrazine was 22° C., said temperature rising to 41° and establishing at 42° C. for 0.5 hour. At the end of this time the temperature rose to 52° C. where the solution solidified and 100 grams of benzene were added. A Dean-Stark water trap was placed on the condensation flask and 300 grams of toluene were added to the reaction mixture. The temperature was increased to the reflux temperature of toluene and maintained thereat for a period of about 3 hours, the water of addition which formed being collected in the trap. Suspended crystals were filtered off and crystallized from isopropanol M.P. 354–360° C. percent nitrogen 3.46.

The mother liquor and remaining precipitate which formed were filtered off with suction, the mother liquor depositing out crystalline needles upon evaporation having a melting point at about 360° C. The crystalline needles which comprise the N,N′-bis-imide of 5,6,7,8,9,9-hexachloro - 1,2,3,4,4a,5,8,8a-octahydro-5,8-methano-2,3-naphthalenedicarboxylic acid were subjected to analysis with the following result:

Found: N, 3.46%; Cl, 47.7%. Theoretical: N, 3.32%; Cl, 50.2%.

The precipitate which had been filtered was recrystallized from acetone and gave a crystalline needle-like solid having a melting point of about 360° C. with decomposition following.

Example II

In this example 437 grams (1.0 mole) of 5,6,7,8,9,9-hexachloro - 1,2,3,4,4a,5,8,8a - octahydro-1,4,5,8-dimethano-2,3-napthalenedicarboxylic anhydride in 200 grams of methyl alcohol are placed in a condensation flask and 16 grams (0.5 mole) of hydrazine in 100 grams of methyl alcohol are slowly added drop-wise during a period of about 0.5 hour. During the addition, which is accompanied by continuous stirring, the temperature of the flask will raise from ambient up to about 40° C. Upon completion of the addition of the hydrazine a Dean-Stark trap is added to the apparatus, 300 grams of toluene are added to the reaction mixture and the temperature of the flask is raised, by heating means, to the reflux temperature of toluene. The temperature is maintained at reflux until all of the water of addition which is formed is collected from the trap. Following this the reaction mixture is allowed to cool to room temperature and treated in a manner similar to that set forth in Example I above, the desired product comprising the N,N′-bis-imide of 5,6,7,8,9,9-hexachloro-1,3,4,4a,5,8,8a-octahydro - 1,4,5,8-dimethano-2,3-naphthalenedicarboxylic acid being recovered.

Example III

In this example 389 grams (1.0 mole) of 1,4,5,6,7,7,-hexachlorobicyclo[2.2.1]-5-heptene-2,3-dicarboxylic acid which is combined with 200 grams of methyl alcohol are placed in a condensation flask. Following this 16.0 grams (0.5 mole) of hydrazine in 100 grams of methyl alcohol are slowly added drop-wise during a period of 0.5 hour. The temperature of the flask which was at room temperature at the beginning of the addition will rise, due to heat of reaction, to a temperature of about 40° C. during the addition. Upon completion of the addition of the hydrazine, a Dean-Stark water trap is added to the apparatus and a solvent comprising 300 grams of toluene is added to the reaction mixture. The flask and contents thereof are heated to the relux temperature of toluene and maintained thereat until all of the water of addition which is formed during the reaction has been collected in the trap. At the end of this time the flask and contents thereof are allowed to cool to room temperature and mother liquor and precipitate which has formed during the reaction are recovered, separated from the solvent which is removed by conventional means and treated to recover the desired product comprising the N,N′-bis-imide of 1,4,5,6,7,7 - hexachlorobicyclo[2.2.1]-5-heptene-2,3-dicarboxylic acid.

Example IV

In a manner similar to that set forth in Example 1 above, 425 g. (1.0 mole) of 5,6,7,8,9,9-hexachloro-1,2,3, 4,4a,5,8,8a, - octahydro - 5,8-methano-2,3-naphthalenedicarboxylic acid was suspended in 200 g. of absolute methyl alcohol. The solution was continuously stirred while 17.1 g. of 95% hydrazine dissolved in 100 g. of absolute methyl alcohol was added thereto. After a period of about 10 minutes had elapsed the solution cleared and methyl alcohol began to distill over in the Dean-Stark tube. After a further period of 0.5 hour the suspended solution precipitated out as a non-stirrable mass. Following this, 300 g. of toluene was added and within a period of 3 hours all of the methyl alcohol plus 17 cc. of water was collected in the tube. The suspended crystals were filtered off, washed with toluene and n-pentane and dried in air for 1 hours in an oven at about 90° C. The crystals had a melting point of about 360° C. Carbon-hydrogen analysis of the crystals gave the following results.

Found: C, 37.2%; H, 2.1%. Theory: C, 37.0%; H, 1.9%.

Example V

The N,N′-bis-imide of tetrahydrophthalic anhydride is reacted with hexabromocyclopentadiene in toluene while mixing and refluxing the solution for a period of about 2 hours. The solid which precipitates, comprising the N,N′-bis-imide of 5,6,7,8,9,9 - hexabromo - 1,2,3,4,4a,5,8,8a-octahydro-5,8-methano-2,3-naphthalenedicarboxylic acid, is recovered by filtration and recrystallized from toluene.

We claim as our invention:

1. A composition of matter possessing the formula:

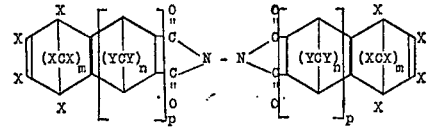

in which X and Y are selected from the group consisting of hydrogen and halogen radicals, at least two X's being halogen, $m$ is an integer of from one to two, $n$ ranges from zero to two and $p$ ranges from zero to one.

2. A composition of matter as set forth in claim 1 in which X is chlorine.

3. A composition of matter as set forth in claim 1 further characterized in that said X is bromine.

4. The N,N′-bis-imide of 5,6,7,8,9,9-hexachloro-1,2,3, 4,4a,5,8,8a - octahydro - 5,8-methano-2,3-naphthalenedicarboxylic acid.

5. A composition of matter as set forth in claim 1 being the N,N′ - bis-imide of 5,6,7,8,9,9-hexahalo-1,2,3, 4,4a,5,8,8a - octahydro - 1,4,5,8 - dimethano-2,3-naphthalenedicarboxylic acid in which the halogens are chlorine or bromine.

6. A composition of matter as set forth in claim 1 being the N,N′-bis-imide of 5,6,7,8,9,9-hexahalo-1,2,3,4, 4a,5,8,8a - octahydro - 5,8-methano-2,3-naphthalenedicarboxylic acid in which the halogens are chlorine or bromine.

7. A composition of matter as set forth in claim 1 being the N,N′-bis-imide of 5,6,7,8-tetrahalo-1,2,3,4,4a, 5,8,8a - octahydro - 5,8 - methano - 2,3-naphthalenedicarboxylic acid in which the halogens are chlorine or bromine.

8. A composition of matter as set forth in claim 1 being the N,N′-bis-imide of 1,4,5,6,7,7-hexahalobicyclo (2.2.1)-5-heptene-2,3-dicarboxylic acid in which the halogens are chlorine or bromine.

No references cited.

NICHOLAS S. RIZZO, Primary Examiner

J. A. NARCAVAGE, Assistant Examiner

U.S. Cl. X.R.

8—94.1; 106—15; 117—137; 161—403; 252—8.1; 260—2.5, 45.8, 346.3, 514